(12) United States Patent
Jang

(10) Patent No.: US 11,458,840 B2
(45) Date of Patent: Oct. 4, 2022

(54) METHOD AND DEVICE FOR CONTROLLING CRUISE DRIVING OF VEHICLE

(71) Applicants: Hyundai Motor Company, Seoul (KR); Kia Motors Corporation, Seoul (KR)

(72) Inventor: Hwa Yong Jang, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 155 days.

(21) Appl. No.: 17/103,403

(22) Filed: Nov. 24, 2020

(65) Prior Publication Data
US 2021/0206264 A1   Jul. 8, 2021

(30) Foreign Application Priority Data
Jan. 6, 2020   (KR) ........................ 10-2020-0001328

(51) Int. Cl.
*B60K 31/00* (2006.01)
*B60L 7/18* (2006.01)
*G01C 21/36* (2006.01)
*B60K 6/26* (2007.10)

(52) U.S. Cl.
CPC ............ *B60K 31/0066* (2013.01); *B60L 7/18* (2013.01); *B60K 6/26* (2013.01); *B60K 2031/0091* (2013.01); *B60Y 2200/92* (2013.01); *G01C 21/36* (2013.01)

(58) Field of Classification Search
None
See application file for complete search history.

(56) References Cited

U.S. PATENT DOCUMENTS

2020/0406894 A1* 12/2020 Akella .................. G01S 17/931

* cited by examiner

*Primary Examiner* — Todd Melton
(74) *Attorney, Agent, or Firm* — Fox Rothschild LLP

(57) ABSTRACT

A method for controlling cruise driving of a vehicle performed by a controller is provided. The method includes determining whether a turning section is present on a road in front of the vehicle based on information of the road included in navigation information. When the turning section is present on the road, the turning section is divided into an entry area and an escape area. The entry area is an area where speed of the vehicle is adjusted from cruise driving speed to target deceleration speed and the escape area is an area where speed of the vehicle is controlled from the target deceleration speed to the cruise driving speed. When the vehicle is located in the entry area a starter-generator connected to an engine is operated to perform regenerative braking to reduce the speed of the vehicle from the cruise driving speed to the target deceleration speed.

13 Claims, 5 Drawing Sheets

METHOD AND DEVICE FOR CONTROLLING CRUISE DRIVING OF VEHICLE

CROSS-REFERENCE TO RELATED APPLICATION

This application claims priority to and the benefit of Korean Patent Application No. 10-2020-0001328 filed on Jan. 6, 2020, the entire contents of which are incorporated herein by reference.

BACKGROUND

(a) Field of the Disclosure

The present disclosure relates to a vehicle, and more particularly, to a method and a device for controlling cruise driving of a vehicle.

(b) Description of the Related Art

A hybrid electric vehicle uses both an internal combustion engine and a battery power source. The hybrid electric vehicle efficiently combines the torque of the internal combustion engine and the torque of a motor. Hybrid electric vehicles may be categorized as either a hard type or a mild type according to a power sharing ratio between the engine and the motor. In the case of the mild type of hybrid electric vehicle (or a mild hybrid electric vehicle), a mild hybrid starter & generator (MHSG) configured to start the engine or generate electricity according to an output of the engine is used instead of an alternator. In the case of the hard type of hybrid electric vehicle, a driving motor for generating driving torque is used in addition to an integrated starter & generator (ISG) configured to start the engine or generate electricity.

The mild hybrid electric vehicle does not provide a driving mode in which torque of the MHSG is used for the main driving torque, but the MHSG may assist the torque of the engine according to the running state of the vehicle and may charge a battery (e.g., a 48 V battery) through regenerative braking. Accordingly, the fuel efficiency of the mild hybrid electric vehicle may be improved. A cruise control system having an auto cruise function is included in a vehicle to improve driver convenience. The cruise control system allows the vehicle to travel at a target speed desired by the driver although the driver does not manipulate an accelerator pedal and a brake pedal of the vehicle. Thus, the cruise control system may reduce fatigue of the driver during long distance travel.

The above information disclosed in this section is merely for enhancement of understanding of the background of the disclosure, and therefore it may contain information that does not form the prior art that is already known in this country to a person of ordinary skill in the art.

SUMMARY

The present disclosure provides a method for controlling cruise driving of a vehicle which is capable of controlling or adjusting cruise driving in a turning section (e.g., a rotation section) of a road on which the vehicle is traveling.

An exemplary embodiment of the present disclosure provides a method for controlling cruise driving of the vehicle that may include: determining, by a controller, whether a turning section is present on a road in front of the vehicle based on information of the road included in navigation information transmitted from a navigation device of the vehicle; when the turning section is present on the road in front of the vehicle, dividing, by the controller, the turning section into an entry area and an escape area, wherein the entry area is an area in which a speed of the vehicle is adjusted from a cruise driving speed to a target deceleration speed and the escape area is an area in which the speed of the vehicle is adjusted from the target deceleration speed to the cruise driving speed; determining, by the controller, whether the vehicle is located in the entry area or the escape area based on position information of the turning section of the road included in the navigation information and position information of the vehicle; and when the vehicle is located in the entry area, operating, by the controller, a starter-generator connected to an engine of the vehicle to perform regenerative braking to reduce the speed of the vehicle from the cruise driving speed to the target deceleration speed.

When the speed of the vehicle is reduced from the cruise driving speed to the target deceleration speed, an amount of regenerative braking performed by the starter-generator may be increased. The method for controlling cruise driving of the vehicle may further include: determining, by the controller, the target deceleration speed in response to detecting the turning section on the road in front of the vehicle. Additionally, the method for controlling cruise driving of the vehicle may include: operating, by the controller, the starter-generator as a motor to adjust the speed of the vehicle from the target deceleration speed to the cruise driving speed when the vehicle is located in the escape area of the turning section.

Another exemplary embodiment of the present disclosure provides a method for controlling cruise driving of the vehicle that may include: determining, by a controller, whether a turning section is present on a road in front of the vehicle based on information of the road included in navigation information transmitted from a navigation device of the vehicle; when the turning section is present on the road in front of the vehicle, dividing, by the controller, the turning section into a first area, a second area, and a third area, wherein the first area is an area in which a speed of the vehicle is adjusted from a cruise driving speed to a target deceleration speed, the second area is an area in which the speed of the vehicle is maintained at the target deceleration speed, and the third area is an area in which the speed of the vehicle is adjusted from the target deceleration speed to the cruise driving speed; determining, by the controller, whether the vehicle is located in the first area, the second area, or the third area based on position information of the turning section of the road included in the navigation information and position information of the vehicle; and in response to determining that the vehicle is located in the first area, operating, by the controller, a starter-generator connected to an engine of the vehicle to perform regenerative braking to adjust the speed of the vehicle from the cruise driving speed to the target deceleration speed.

When the speed of the vehicle is reduced from the cruise driving speed to the target deceleration speed, an amount of regenerative braking performed by the starter-generator may be increased. The method for controlling cruise driving of the vehicle may further include: determining, by the controller, the target deceleration speed in response to detecting there is the turning section on the road in front of the vehicle. Additionally, the method may include: operating, by the controller, the starter-generator to maintain the speed of the vehicle at the target deceleration speed when the vehicle is located in the second area. The method for controlling cruise driving of the vehicle may further include: operating, by the controller, the starter-generator to adjust the speed of the vehicle from the target deceleration speed to the cruise driving speed when the vehicle is located in the third area.

An exemplary embodiment of the present disclosure provides the device for controlling cruise driving of the vehicle that may include: a starter-generator configured to start an engine of the vehicle and generate electricity according to an output of the engine; a navigation device configured to transmit navigation information; and a controller configured to determine whether a turning section is present on a road in front of the vehicle based on information of the road included in the navigation information. In response to determining that the turning section is present on the road in front of the vehicle, the controller may be configured to divide the turning section into an entry area and an escape area. The entry area may be an area in which a speed of the vehicle is adjusted from a cruise driving speed to a target deceleration speed and the escape area may be an area in which the speed of the vehicle is adjusted from the target deceleration speed to the cruise driving speed. The controller may be configured to determine whether the vehicle is located in the entry area or the escape area based on position information of the turning section of the road included in the navigation information and position information of the vehicle. When the vehicle is located in the entry area, the controller may be configured to operate a starter-generator connected to the engine to be operated as a generator so that the starter-generator performs regenerative braking.

When the speed of the vehicle is reduced from the cruise driving speed to the target deceleration speed, an amount of regenerative braking performed by the starter-generator may be increased. In response to detecting the turning section on the road in front of the vehicle, the controller may be configured to determine the target deceleration speed. When the vehicle is located in the escape area of the turning section, the controller may be configured to operate the starter-generator as a motor to adjust the speed of the vehicle from the target deceleration speed to the cruise driving speed.

The method and the device for controlling cruise driving of the vehicle according to the exemplary embodiment of the present disclosure may reduce a speed of the vehicle by performing regenerative braking when the vehicle enters the turning section during cruise driving. Thus, the exemplary embodiment of the present disclosure may collect energy and improve driving safety of the vehicle and a driver of the vehicle.

BRIEF DESCRIPTION OF THE DRAWINGS

A brief description of the drawings will be provided to more sufficiently understand the drawings which are used in the detailed description of the present disclosure.

DETAILED DESCRIPTION

Figure 1:
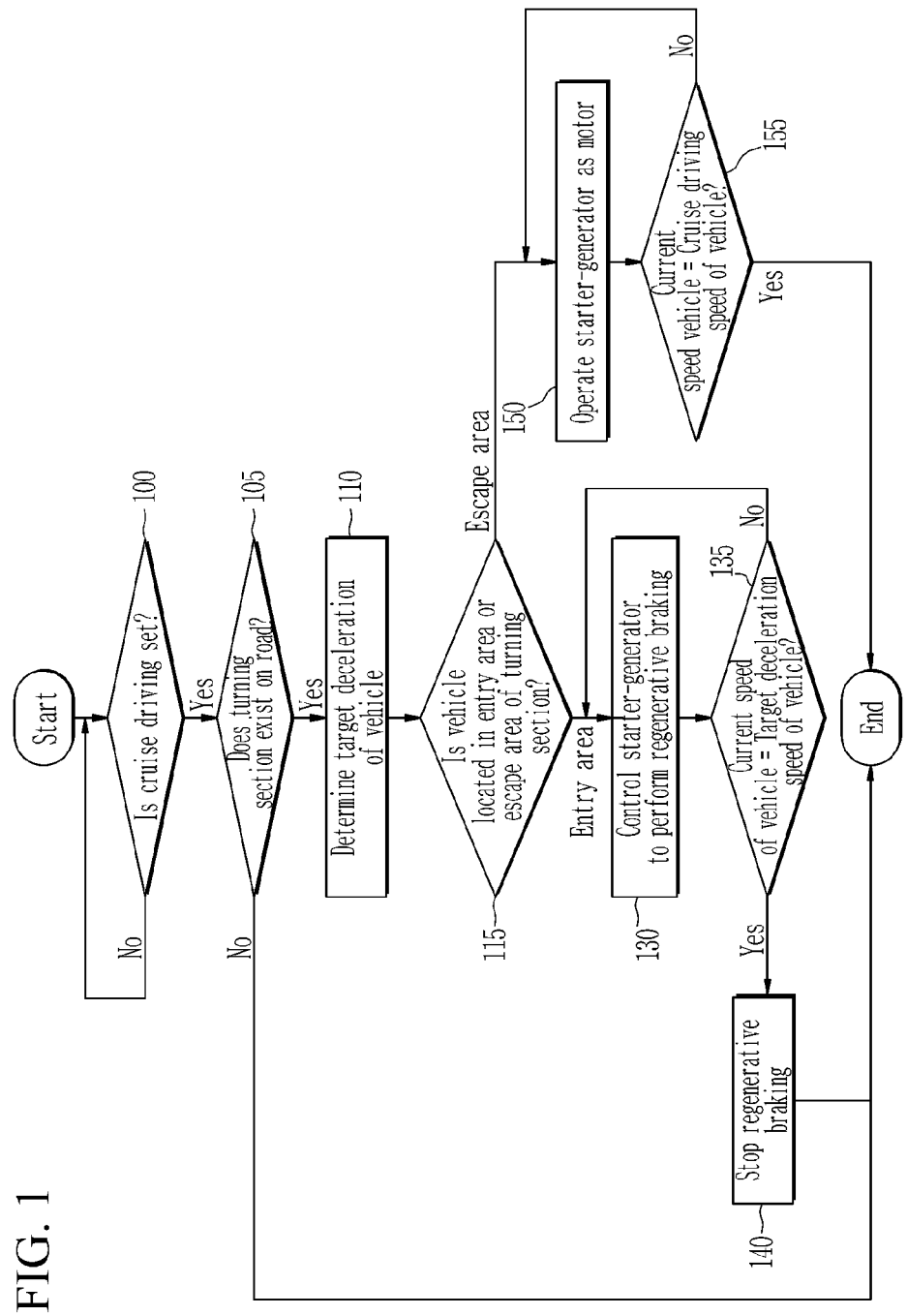
FIG. 1 is a flowchart illustrating a method for controlling cruise driving of a mild hybrid vehicle according to an exemplary embodiment of the present disclosure.

In order to sufficiently understand the present disclosure and the object achieved by embodying the present disclosure, the accompanying drawings illustrating exemplary embodiments of the present disclosure and contents described in the accompanying drawings are to be referenced.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

Furthermore, control logic of the present disclosure may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, the present disclosure will be described in detail by describing exemplary embodiments of the present disclosure with reference to the accompanying drawings. In describing the present disclosure, well-known configurations or functions will not be described in detail since they may unnecessarily obscure the gist of the present disclosure. Throughout the accompanying drawings, the same reference numerals will be used to denote the same components.

Terms used in the present specification are only used in order to describe specific exemplary embodiments rather than limiting the present disclosure. Singular forms are to include plural forms unless the context clearly indicates otherwise. It will be further understood that the terms "include" or "have" used in the present specification specify the presence of features, numerals, steps, operations, components, or parts mentioned in the present specification, or a combination thereof, but do not preclude the presence or addition of one or more other features, numerals, steps, operations, components, parts, or a combination thereof.

Throughout this specification and the claims that follow, when it is described that an element is "coupled" to another element, the element may be "directly coupled" to the other element or "electrically or mechanically coupled" to the other element through a third element. Unless defined otherwise, it is to be understood that the terms used in the present specification including technical and scientific terms have the same meanings as those that are generally understood by those skilled in the art. It must be understood that the terms defined by the dictionary are identical with the meanings within the context of the related art, and they should not be ideally or excessively formally defined unless the context clearly dictates otherwise.

Figure 2:
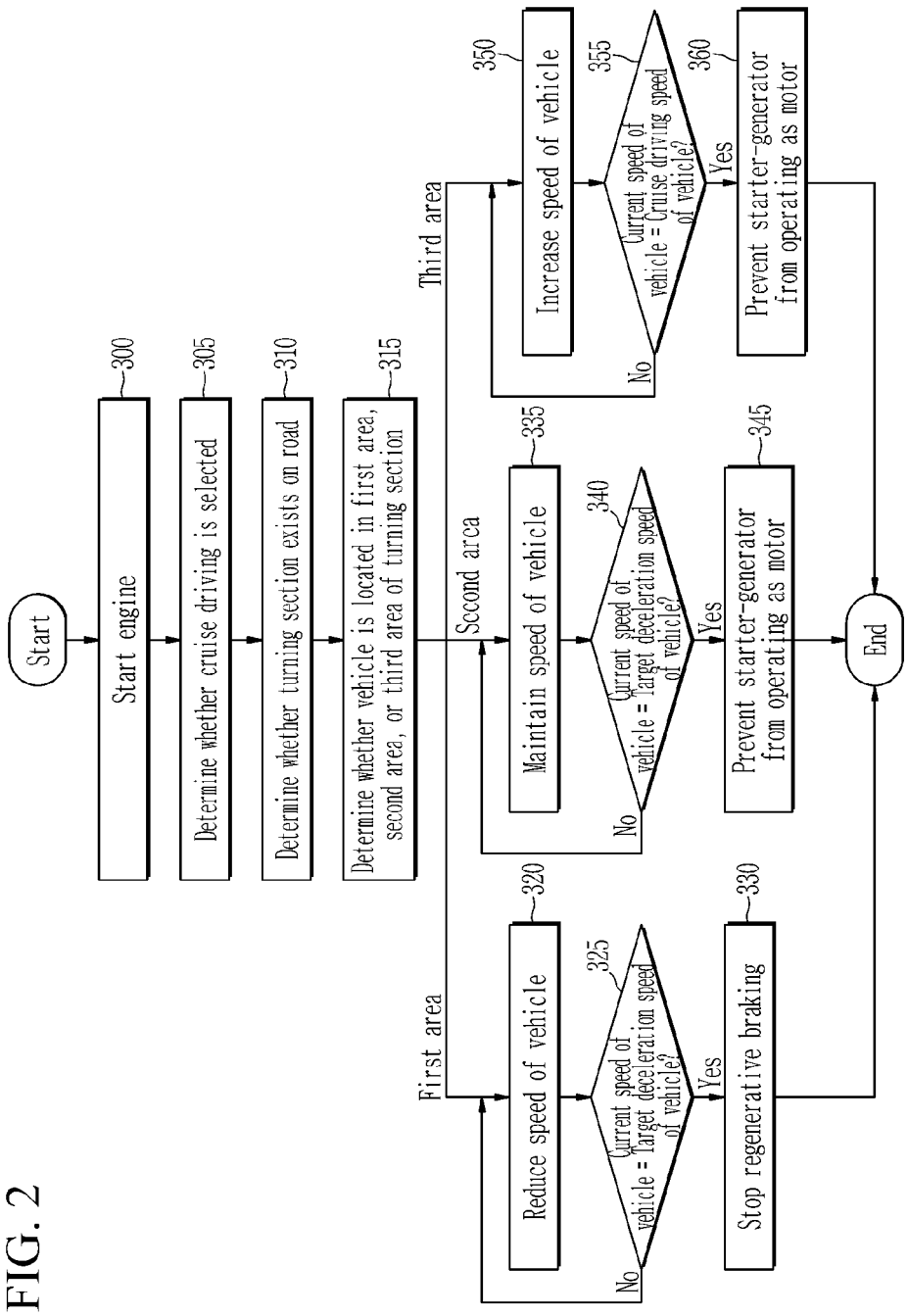
FIG. 2 is a flowchart illustrating a method for controlling cruise driving of a mild hybrid vehicle according to another exemplary embodiment of the present disclosure.
Figure 3:
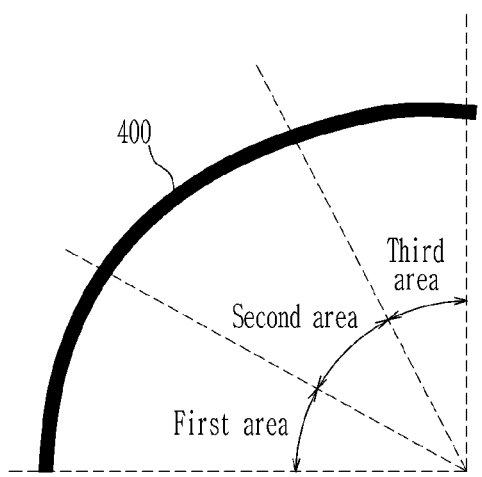
FIG. 3 is a view explaining the example of a turning section shown in FIG. 2 according to an exemplary embodiment of the present disclosure.
Figure 4:
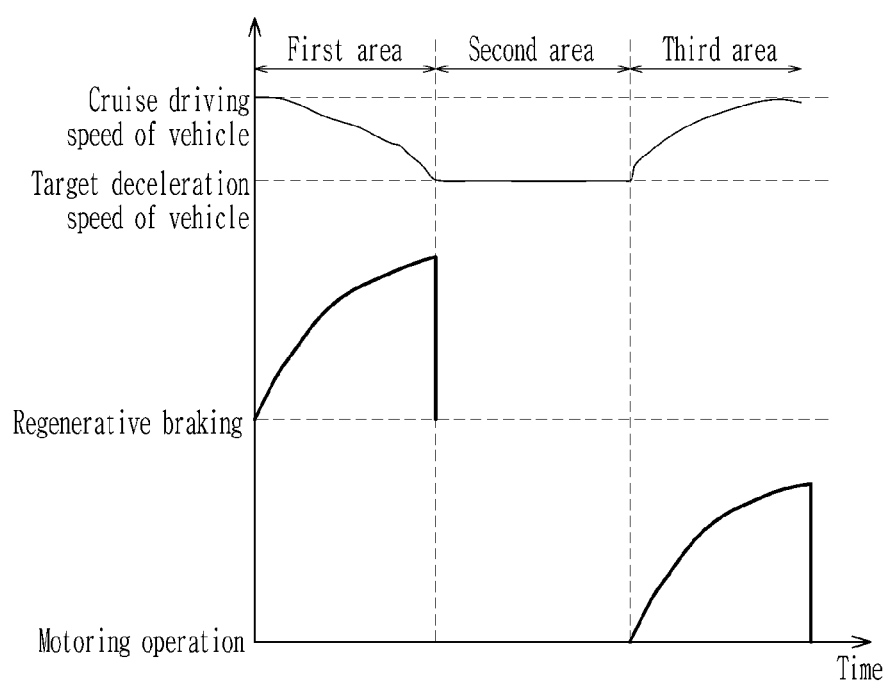
FIG. 4 is a graph explaining an operation state of the mild hybrid vehicle according to areas of the turning section shown in FIG. 3.
Figure 5:
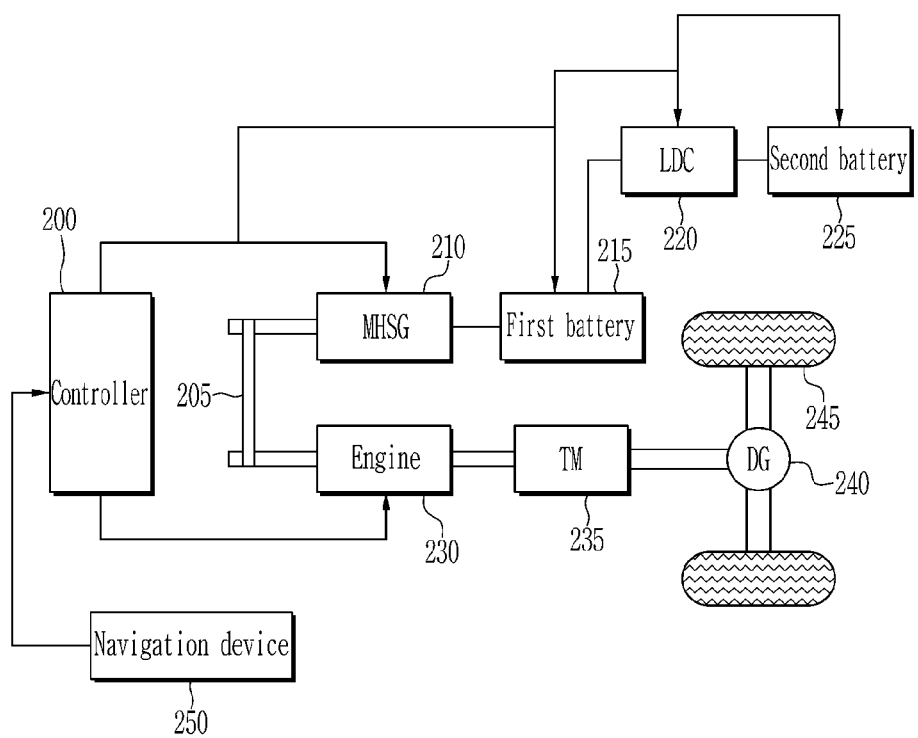
FIG. 5 is a block diagram explaining the mild hybrid vehicle to which the methods for controlling cruise driving of the mild hybrid vehicle shown in FIG. 1 and FIG. 2 are applied.

A vehicle using a cruise function according to a related art does not reduce speed of the vehicle in a turning section of a road or reduces speed of the vehicle in the turning section using an electronic stability control (ESC) system and a front radar that are used for an autonomous driving function. FIG. 1 is a flowchart illustrating a method for controlling cruise driving of a mild hybrid vehicle according to an exemplary embodiment of the present disclosure. FIG. 2 is a flowchart illustrating a method for controlling cruise driving of a mild hybrid vehicle according to another exemplary embodiment of the present disclosure. FIG. 3 is a view explaining the example of a turning section shown in FIG. 2. FIG. 4 is a graph explaining an operation state of the mild hybrid vehicle according to areas of the turning section shown in FIG. 3. FIG. 5 is a block diagram explaining the mild hybrid vehicle to which the methods for controlling cruise driving of the mild hybrid vehicle shown in FIG. 1 and FIG. 2 are applied.

Referring to FIGS. 1 and 5, in a determination step 100, a controller 200 may be configured to determine whether cruise driving (or a cruise function) is set or selected by a driver of the mild hybrid vehicle. When the cruise driving is selected, the controller 200 may be configured to operate an engine 230 to control the speed of the mild hybrid vehicle to a target speed of the vehicle which is a cruise driving speed of the vehicle set by the driver. The controller 200 may be configured to perform feedback control to correct an error by repeatedly detecting the error between the target speed of the vehicle and a current speed of the vehicle when the vehicle travels.

As shown in FIG. 5, the mild hybrid vehicle may include the controller 200, a starter-generator (or a mild hybrid starter and generator (MI-ISG)) 210, a high voltage battery 215 that is a first battery, a low voltage DC-DC converter (LDC) 220, a low voltage battery 225 that is a second battery, the engine 230 such as a diesel engine or a gasoline engine, a transmission 235, a differential gear device 240, wheels 245, and a navigation device 250. A device for controlling a cruise driving of the vehicle may include the controller 200, the starter-generator 210, the engine 230, and the navigation device 250.

The controller 200 may be an electronic control unit (ECU) and may be configured to execute an entire operation of the mild hybrid vehicle. For example, the controller 200 may be one or more microprocessors operated by a program or hardware (e.g., a microcomputer) including the microprocessor. The program may include a series of commands for executing the method for controlling cruise driving of the mild hybrid vehicle according to the exemplary embodiment of the present disclosure. The commands may be stored in a memory of the mild hybrid vehicle.

The engine 230 may be configured to convert chemical energy to mechanical energy by burning fuel and air. Torque of the engine 230 may be transmitted to an input shaft of the transmission 235, and torque output from an output shaft of the transmission may be transmitted to an axle of the vehicle via the differential gear device 240. The axle may rotate the wheels 245 so that the mild hybrid vehicle may be driven.

The starter-generator 210 may be configured to convert electrical energy to mechanical energy or mechanical energy to electrical energy. In other words, the starter-generator 210 may be configured to start the engine 230 or generate electricity according to an output of the engine. In addition, the starter-generator 210 may assist the torque of the engine 230. The mild hybrid vehicle may use the torque of the starter-generator 210 as an auxiliary power while combustion torque of the engine 230 is a main power. The engine 230 and the starter-generator 210 may be connected via a belt 205 (or a pulley and the belt). In the mild hybrid vehicle, the starter-generator 210 may be a part performing a function of an alternator, the engine torque assist, or regenerative braking.

The starter-generator 210 may be configured to drive the engine 230 of the vehicle in a cranking and torque control mode of the vehicle (or the engine) and generate electricity according to an output of the engine to charge a 48 V battery (or a 48 volt battery) 215 using an inverter in an electricity generation mode of the vehicle. The starter-generator 210 may be configured to operate in an operating mode in accordance with a driving state of the vehicle. The operating mode may include an engine starting mode, an engine torque assist mode for assisting torque of the engine 230 by operating as a motor, and a regenerative braking mode for charging the 48 V battery 215.

The first battery 215 may be configured to supply electricity to the starter-generator 210 or may be charged by electricity collected through the starter-generator 210 in a regenerative braking mode of the vehicle. The first battery 215 may be, for example, the 48 V battery, and may be configured to charge the second battery 225 using the low voltage DC-DC converter (LDC) 220. The LDC 220 may be configured to convert voltage supplied from the first battery 215 to a low voltage to charge the second battery 225.

The second battery 225 may be, for example, a 12 volt battery, and may be configured to supply a low voltage (or a low power) to an electric load (e.g., a headlamp or an air conditioner) of the vehicle. The controller 200 may be connected to the starter-generator 210, the first battery 215, the LDC 220, the second battery 225, and the engine 230 via controller area network (CAN) communication and local interconnect network (LIN) communication.

The navigation device 250 may be configured to receive road information and traffic information from a server of an intelligent transport system (ITS) or a telematics server installed in outside of the vehicle to generate navigation information and may be configured to provide or transmit the navigation information to the controller 200. The road information may include position information of a road and information on a turning section of the road. The navigation information may include path information to a destination input by the driver of the vehicle. The road information may further include gradient of the road, curvature of the road, or speed limit of the road. The navigation device 250 may include a global positioning system (GPS) receiver configured to generate position information of the vehicle.

According to a determination step 105 shown in FIG. 1, the controller 200 may be configured to determine whether a turning section (or a curve section) is present on a road in front of the vehicle based on information of the road included in the navigation information transmitted from the navigation device 250 of the vehicle. According to a step 110, in response to detecting the turning section on the road in front of the vehicle, the controller 200 may be configured to determine a target deceleration speed (or a target reduction speed) of the vehicle for passing through the turning section for safe driving of the vehicle. The target deceleration speed may be determined by a test and may be stored in the vehicle's memory.

According to a step 115, in response to determining that the turning section is present on the road in front of the vehicle, the controller 200 may be configured to divide the turning section into an entry area and an escape area. The entry area may be an area in which a speed of the vehicle is adjusted from the cruise driving speed of the vehicle to the target deceleration speed of the vehicle for safe driving and regenerative braking of the vehicle. The escape area may be an area in which the speed of the vehicle is adjusted from the target deceleration speed to the cruise driving speed. The method of dividing the turning section into the entry area and the escape area may be determined by a test based on the target deceleration speed for safe driving of the vehicle, and may be stored in the memory of the vehicle. The controller 200 may be configured to determine whether the vehicle is located in the entry area or the escape area based on position information of the turning section of the road included in the navigation information and the position information of the vehicle.

According to a step 130, in response to determining that the vehicle is positioned (or entered) in the entry area, the controller 200 may be configured to operate the starter-generator 210 connected to the engine 230 to perform regenerative braking or be operated as a generator to adjust the speed of the vehicle from the cruise driving speed to the target deceleration speed. When the speed of the vehicle is reduced from the cruise driving speed to the target deceleration speed, an amount of regenerative braking performed by the starter-generator 210 may be increased. The regenerative braking may be configured to collect braking energy during driving by braking of the vehicle through electricity generation of the starter-generator 210 connected to an engine 230 to charge the high voltage battery 215 that is the first battery.

According to a step 135, after the step 130, the controller 200 may be configured to determine whether the current speed of the vehicle is equal to the target deceleration speed using a speed sensor included in the vehicle. In response to determining that the current speed of the vehicle is equal to the target deceleration speed, the method for controlling cruise driving of the mild hybrid vehicle, which is a process, may proceed to a step 140, and in response to determining that the current speed of the vehicle is not equal to the target deceleration speed, the process may proceed to the step 130. According to the step 140, the controller 200 may be configured to stop the regenerative braking.

In another exemplary embodiment of the present disclosure, the steps 135 and 140 may be omitted. According to a step 150, in response to determining that the vehicle is located in the escape area of the turning section, the controller 200 may be configured to operate the starter-generator 210 as a motor to control or adjust the speed of the vehicle from the target deceleration speed to the cruise driving speed. According to a step 155, after the step 150, the controller 200 may be configured to determine whether the current speed of the vehicle is equal to the cruise driving speed of the vehicle using the speed sensor included in the vehicle.

When the current speed of the vehicle is equal to the cruise driving speed, the method for controlling cruise driving of the mild hybrid vehicle, which is the process, may be terminated, and when the current speed of the vehicle is not equal to the cruise driving speed, the process may proceed to the step 150. In another exemplary embodiment of the present disclosure, the steps 150 and 155 may be omitted.

Referring to FIG. 2 through FIG. 5, in a start step 300, the controller 200 may be configured to operate the starter-generator 210 in response to the driver's request to start the engine 230 of the vehicle. According to a step 305, after the start step 300, the controller 200 may be configured to determine whether cruise driving of the vehicle is selected by the driver. When the cruise driving is selected, the controller 200 may be configured to operate the engine 230 to adjust the speed of the mild hybrid vehicle to a target speed of the vehicle which is a cruise driving speed of the vehicle set by the driver. The controller 200 may be configured to perform feedback control to correct an error by repeatedly detecting the error between the target speed of the vehicle and a current speed of the vehicle when the vehicle travels.

According to a step 310, the controller 200 may be configured to determine whether a turning section 400 is present on a road in front of the vehicle based on information of the road included in the navigation information transmitted from the navigation device 250 of the vehicle. In response to determining that the turning section is present on the road in front of the vehicle, the controller 200 may be configured to determine a target deceleration speed of the vehicle for passing through the turning section for safe driving of the vehicle. The target deceleration speed may be determined by a test and may be stored in the vehicle's memory.

According to a step 315, in response to determining that the turning section 400 is present on the road in front of the vehicle, as shown in FIG. 3, the controller 200 may be configured to divide the turning section into a first area, a second area, and a third area. The first area may be an area in which a speed of the vehicle is adjusted from the cruise driving speed of the vehicle to the target deceleration speed of the vehicle for safe driving and regenerative braking of the vehicle. The second area may be an area in which the speed of the vehicle is maintained at the target deceleration speed. The third area may be an area in which the speed of the vehicle is adjusted from the target deceleration speed to the cruise driving speed. The method of dividing the turning section into the first area, the second area, and the third area may be determined by a test based on the target deceleration speed for safe driving of the vehicle, and may be stored in the memory of the vehicle. The controller 200 may be configured to determine whether the vehicle is located in the first area, the second area, or the third area based on position information of the turning section of the road included in the navigation information and the position information of the vehicle.

According to a step 320, when the vehicle is located in the first area, as shown in FIG. 4, the controller 200 may be configured to operate the starter-generator 210 connected to the engine 230 to perform regenerative braking or be operated as a generator to adjust the speed of the vehicle from the cruise driving speed to the target deceleration speed. When the speed of the vehicle is reduced from the cruise driving speed to the target deceleration speed, as shown in FIG. 4, an amount of regenerative braking performed by the starter-generator 210 may be increased.

According to a step 325, after the step 320, the controller 200 may be configured to determine whether the current speed of the vehicle is equal to the target deceleration speed using the speed sensor mounted within the vehicle. When the current speed of the vehicle is equal to the target deceleration speed, the method for controlling cruise driving of the mild hybrid vehicle, which is a process, may proceed to a step 330, and when the current speed of the vehicle is not equal to the target deceleration speed, the process may proceed to the step 320. According to the step 330, the controller 200 may be configured to stop the regenerative braking.

In another exemplary embodiment of the present disclosure, the steps 325 and 330 may be omitted. According to a step 335, when the vehicle is located in the second area, as shown in FIG. 4, the controller 200 may be configured to operate the starter-generator 210 as a motor to maintain the speed of the vehicle at the target deceleration speed. When the speed of the vehicle is maintained at the target deceleration speed, the controller 200 may not operate the starter-generator 210.

According to a step 340, after the step 335, the controller 200 may be configured to determine whether the current speed of the vehicle is equal to the target deceleration speed using the speed sensor included in the vehicle. When the current speed of the vehicle is equal to the target deceleration speed, the method for controlling cruise driving of the mild hybrid vehicle, which is the process, may proceed to a step 345, and when the current speed of the vehicle is not equal to the target deceleration speed, the process may proceed to the step 335.

According to the step 345, the controller 200 may be configured to prevent the starter-generator 210 from operating as a motor. In other words, the controller 200 may be configured to prevent the starter-generator 210 from performing a motoring operation. In another exemplary embodiment of the present disclosure, the steps 340 and 345 may be omitted. According to a step 350, when the vehicle is located in the third area, as shown in FIG. 4, the controller 200 may be configured to operate the starter-generator 210 as a motor to adjust the speed of the vehicle from the target deceleration speed to the cruise driving speed.

According to the step 355, after the step 350, the controller 200 may be configured to determine whether the current speed of the vehicle is equal to the cruise driving speed using the speed sensor included in the vehicle. When the current speed of the vehicle is equal to the cruise driving speed, the method for controlling cruise driving of the mild hybrid vehicle, which is the process, may proceed to a step 360, and when the current speed of the vehicle is not equal to the cruise driving speed, the process may proceed to the step 350.

According to the step 360, the controller 200 may be configured to prevent the starter-generator 210 from operating as a motor. In another exemplary embodiment of the present disclosure, the steps 355 and 360 may be omitted.

The components, "~unit", block, or module which are used in the present exemplary embodiment may be implemented in software such as a task, a class, a subroutine, a process, an object, an execution thread, or a program which is performed in a predetermined region in the memory, or hardware such as a field programmable gate array (FPGA) or an application-specific integrated circuit (ASIC), and may be performed with a combination of the software and the hardware. The components, '~part', or the like may be embedded in a computer-readable storage medium, and some part thereof may be dispersedly distributed in a plurality of computers.

As set forth above, exemplary embodiments have been disclosed in the accompanying drawings and the specification. Herein, specific terms have been used, but are just used for the purpose of describing the present disclosure and are not used for qualifying the meaning or limiting the scope of the present disclosure, which is disclosed in the appended claims. Therefore, it will be understood by those skilled in the art that various modifications and equivalent exemplary embodiments are possible from the present disclosure. Accordingly, the actual technical protection scope of the present disclosure must be determined by the spirit of the appended claims.

DESCRIPTION OF SYMBOLS

200: controller
210: MHSG
215: first battery
230: engine
250: navigation device

What is claimed is:

1. A method for controlling cruise driving of a vehicle, comprising:
   determining, by a controller, whether a turning section is present on a road in front of the vehicle based on information of the road included in navigation information transmitted from a navigation device of the vehicle;
   in response to determining that the turning section is present on the road in front of the vehicle, dividing, by the controller, the turning section into an entry area and an escape area, wherein the entry area is an area in which a speed of the vehicle is adjusted from a cruise driving speed to a target deceleration speed and the escape area is an area in which the speed of the vehicle is adjusted from the target deceleration speed to the cruise driving speed;
   determining, by the controller, whether the vehicle is located in the entry area or the escape area based on position information of the turning section of the road included in the navigation information and position information of the vehicle; and
   in response to determining that the vehicle is located in the entry area, operating, by the controller, a starter-generator connected to an engine of the vehicle to perform regenerative braking to reduce the speed of the vehicle from the cruise driving speed to the target deceleration speed.

2. The method of claim 1, wherein when the speed of the vehicle is reduced from the cruise driving speed to the target deceleration speed, an amount of regenerative braking performed by the starter-generator is increased.

3. The method of claim 1, further comprising:
   determining, by the controller, the target deceleration speed in response to determining that the turning section is present on the road in front of the vehicle.

4. The method of claim 1, further comprising:
   operating, by the controller, the starter-generator as a motor to adjust the speed of the vehicle from the target deceleration speed to the cruise driving speed in response to determining that the vehicle is located in the escape area of the turning section.

5. A method for controlling cruise driving of a vehicle, comprising:
determining, by a controller, whether a turning section is present on a road in front of the vehicle based on information of the road included in navigation information transmitted from a navigation device of the vehicle;
in response to determining that the turning section is present on the road in front of the vehicle, dividing, by the controller, the turning section into a first area, a second area, and a third area, wherein the first area is an area in which a speed of the vehicle is adjusted from a cruise driving speed to a target deceleration speed, the second area is an area in which the speed of the vehicle is maintained at the target deceleration speed, and the third area is an area in which the speed of the vehicle is adjusted from the target deceleration speed to the cruise driving speed;
determining, by the controller, whether the vehicle is located in the first area, the second area, or the third area based on position information of the turning section of the road included in the navigation information and position information of the vehicle; and
in response to determining that the vehicle is located in the first area, operating, by the controller, a starter-generator connected to an engine of the vehicle to perform regenerative braking to adjust the speed of the vehicle from the cruise driving speed to the target deceleration speed.

6. The method of claim 5, wherein when the speed of the vehicle is reduced from the cruise driving speed to the target deceleration speed, an amount of regenerative braking performed by the starter-generator is increased.

7. The method of claim 5, further comprising:
determining, by the controller, the target deceleration speed in response to determining that the turning section is present on the road in front of the vehicle.

8. The method of claim 5, further comprising:
operating, by the controller, the starter-generator to maintain the speed of the vehicle at the target deceleration speed in response to determining that the vehicle is located in the second area.

9. The method of claim 5, further comprising:
operating, by the controller, the starter-generator to adjust the speed of the vehicle from the target deceleration speed to the cruise driving speed in response to determining that the vehicle is located in the third area.

10. A device for controlling cruise driving of a vehicle, comprising:
a starter-generator configured to start an engine of the vehicle and generate electricity according to an output of the engine;
a navigation device configured to transmit navigation information; and
a controller configured to determine whether a turning section is present on a road in front of the vehicle based on information of the road included in the navigation information,
wherein in response to determining that the turning section is present on the road in front of the vehicle, the controller is configured to divide the turning section into an entry area and an escape area, wherein the entry area is an area in which a speed of the vehicle is adjusted from a cruise driving speed to a target deceleration speed and the escape area is an area in which the speed of the vehicle is adjusted from the target deceleration speed to the cruise driving speed,
wherein the controller is configured to determine whether the vehicle is located in the entry area or the escape area based on position information of the turning section of the road included in the navigation information and position information of the vehicle, and
wherein in response to determining that the vehicle is located in the entry area, the controller is configured to operate a starter-generator connected to the engine to be operated as a generator so that the starter-generator performs regenerative braking.

11. The device of claim 10, wherein when the speed of the vehicle is reduced from the cruise driving speed to the target deceleration speed, an amount of regenerative braking performed by the starter-generator is increased.

12. The device of claim 10, wherein in response to determining that the turning section is present on the road in front of the vehicle, the controller is configured to determine the target deceleration speed.

13. The device of claim 10, wherein in response to determining that the vehicle is located in the escape area of the turning section, the controller is configured to operate the starter-generator as a motor to adjust the speed of the vehicle from the target deceleration speed to the cruise driving speed.

* * * * *